Figure 1:
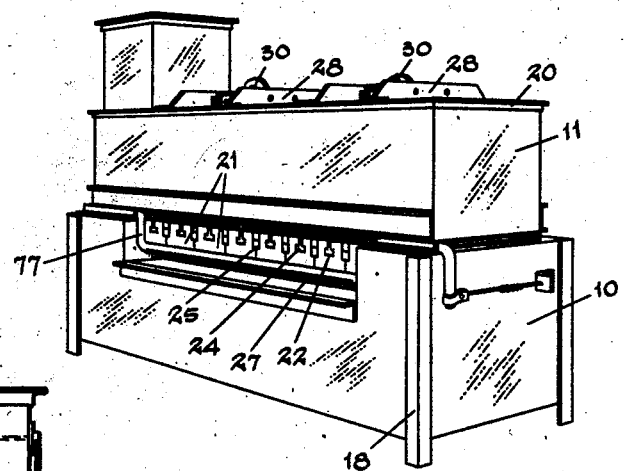

Dec. 29, 1942.  F. G. SCHWALBE  2,306,571
HEAT TREATING FURNACE
Filed Feb. 29, 1940  3 Sheets—Sheet 1

Inventor
Franz G. Schwalbe

Dec. 29, 1942.   F. G. SCHWALBE   2,306,571
HEAT TREATING FURNACE
Filed Feb. 29, 1940   3 Sheets-Sheet 2

Inventor
Franz G. Schwalbe
By (signature)
Attorney

Dec. 29, 1942.  F. G. SCHWALBE  2,306,571
HEAT TREATING FURNACE
Filed Feb. 29, 1940  3 Sheets-Sheet 3
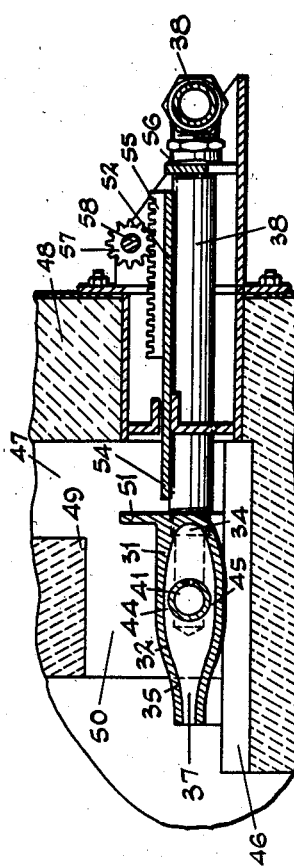
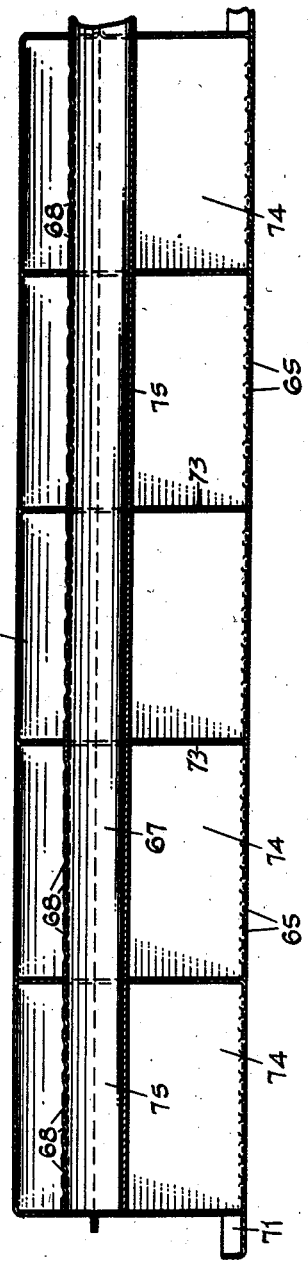
Inventor
Franz G. Schwalbe
By
Attorney

UNITED STATES PATENT OFFICE 2,306,571

HEAT-TREATING FURNACE

Franz G. Schwalbe, Toledo, Ohio

Application February 29, 1940, Serial No. 321,527

3 Claims. (Cl. 158—7)

My invention relates to a furnace, which, if desired, may be used for heat-treating articles and for a great variety of other purposes.

The invention, particularly, relates to means for preheating and directing secondary air to be utilized in a furnace.

The invention has for its object to provide an efficient and compact means for producing heated secondary air and a controlled variable means for directing said air with reference to the burner for heating said furnace. The invention, thus, provides an efficient recuperator, which utilizes the heat of the exhaust gases from the heatng chamber, to heat secondary air and directs it to the burner to be used in fuel combustion to heat the articles within the furnace. The invention, also, has for its object to provide a recuperator of a construction which lends itself readily to adaptation to any of a number of relative dispositions of the source of secondary air and the furnace heating chamber, without the use of extended conduits, having no other function than conducting the heated air from the recuperator to the heating chamber, with a resultant loss of heat from said secondary air, during said conduction.

In this connection, the invention provides one or more metallic recuperator shells located in the exhaust chamber, through which the exhaust gases of the heat-treating chamber pass, the shells being provided with means for volumetrically directing secondary air through various zones defined therein, according to the local heat intensity of the walls in said zones, to raise the temperature of said secondary air and to maintain the parts of the wall of the shell and the inner and outer surfaces of the said parts, at a temperature to prevent burning or warping of the walls of the shell, due to the heat of the exhaust gases transmitted to said zones. Thus, the shells may be located in proximity to the heating chamber and the overall space occupied by the furnace may be, substantially, reduced, and the draft and heat loss from the secondary air, as it is conducted from the recuperator to the heating chamber, may be materially lessened, as compared to that experienced in such constructions as the tower and loop type of recuperators known to the prior art.

The invention, also, has for its object to provide means for directing air against the surface of the shell and air movement continuously along the inner surface of the wall of the shell and cause the air to acquire the maximum heat therefrom, during a comparatively short period of time and while it is traveling a comparatively short distance from its source to the heating chamber of the furnace. Accordingly, the invention provides a shell having a curved side and a V-shaped opposite side, having openings, and a pipe, through which unheated secondary air is distributed within the shell. The pipe has openings formed along one side thereof and is located to dispose the openings diametrically opposite to the shell openings to cause the air to flow against the curved side of said shell. The shell, also, has lateral wall portions, which curvedly join the curved and V-shaped sides and are spaced short distances from the pipe to form narrow slits, or openings, on opposite sides of the pipe, through which the air moves from the curved side to the opposite V-shaped side of the shell. Thus, the air is caused to spread over the surface of the shell and pass through the narrow openings between the surface of the pipe and the inner surface of the shell, and along the opposite inner surfaces of the V-shaped side of the shell. The invention, also, provides a passageway in the wall of the furnace, which extends to the heat-treating chamber, and terminates in a port, in which the burner is located. The interior of the shell communicates with said passageway and the air is directed from the shell to the burner.

The invention has for a further object to provide means for controllably varying the amount, direction, and flow characteristic of the secondary air from the shell and relative to the burner in the furnace heating chamber. Accordingly, the invention provides a burner, which may be movably adjusted to and from a position proximate to the center of flow of the secondary air from the recuperator to the furnace heating chamber. The secondary air may be distributed, uniformly, above the flame, or above and below the flame, by utilizing deflector and baffle plates, provided by the invention. The deflector of baffle plates may be moved, independently of or with the burner, to vary the division of the secondary air, as the burner is adjusted, with respect to the opening, to greatly lengthen the flame.

The invention may be contained in furnaces of different forms, and, to illustrate a practical application of the invention, I have selected a heat-treating furnace as an embodiment of the invention and shall describe the selected structure hereinafter, it being understood that certain features of my invention may be used to advantage without a corresponding use of other features and without departing from the spirit of the invention, as presented in the claims. The particular structure selected is shown in the accompanying drawings.

Figure 2:
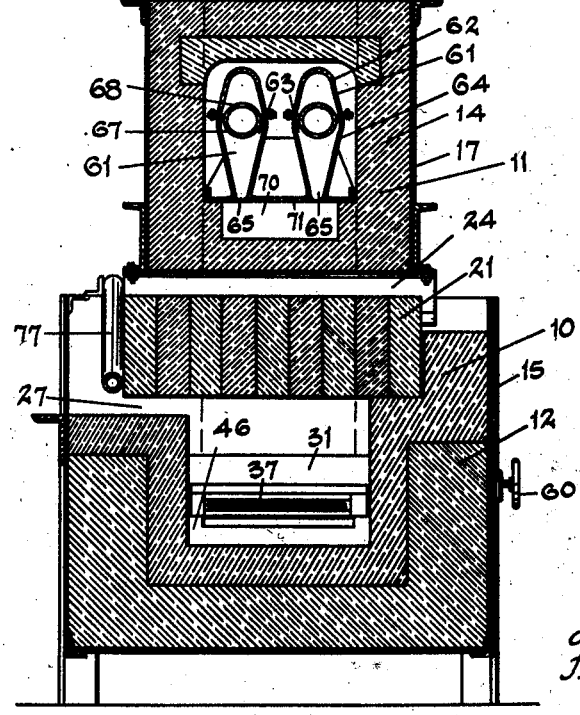
Figure 3:
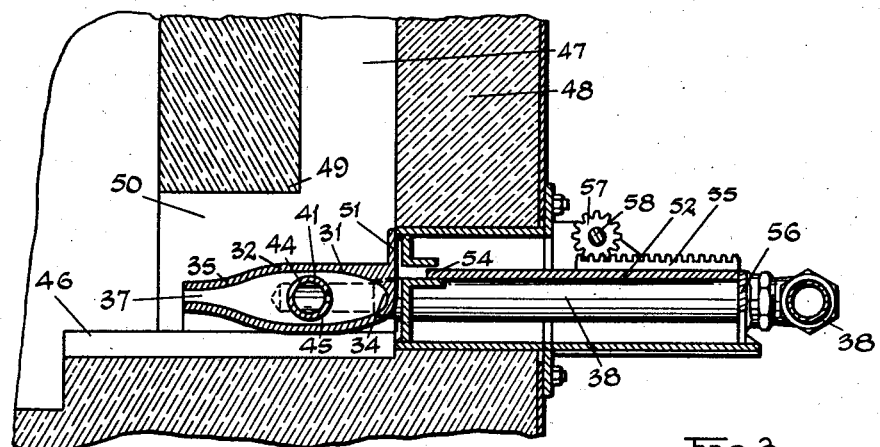
Figure 4:
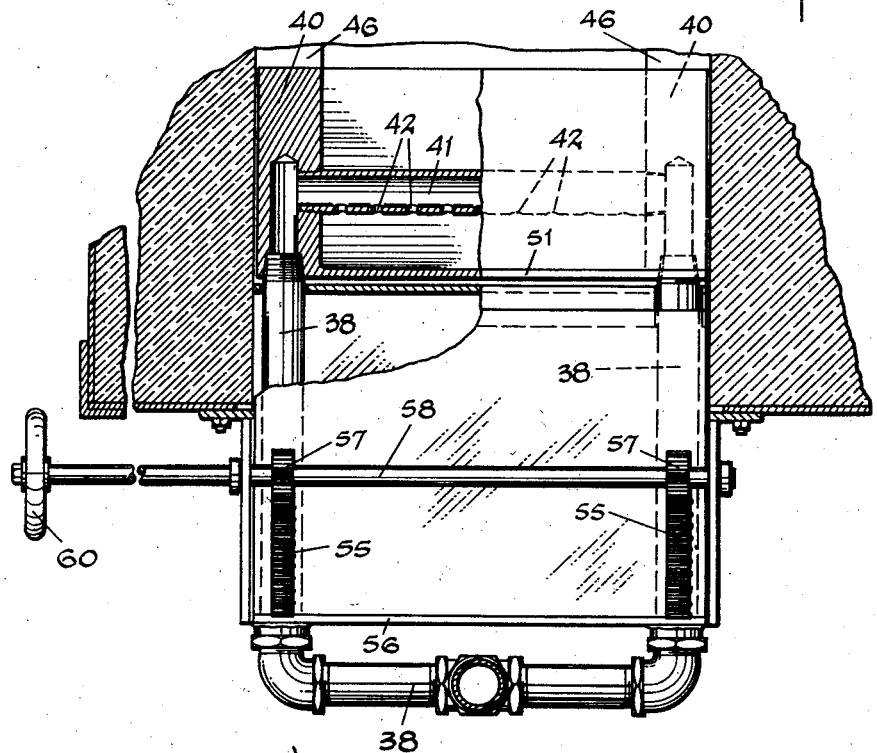

Fig. 1 illustrates a perspective view of the heat-treating furnace. Fig. 2 illustrates a vertical section of the furnace. Fig. 3 illustrates a vertical section of the burner and the end wall of the heating chamber of the furnace. Fig. 4 illustrates a view of a horizontal section of the burner, parts of which are shown broken away to illustrate the details of the structure. Fig. 5 illustrates a longitudinal sectional view of the burner, when the burner and parts thereof are located in certain adjusted positions. Fig. 6 illustrates a longitudinal vertical section of one of the recuperator shells, shown in Fig. 1.

In the form of the furnace illustrated in the figures, 10 indicates the heating chamber unit and 11 indicates the exhaust chamber unit. The units 10 and 11 may be formed of refractory block walls 12 and 14 sheathed in sheet-metal, confining wall parts 15 and 17, joined by suitable angle irons 18 and 20.

The upper wall 21 of the heating chamber is formed of a plurality of closely-positioned blocks, which are connected to the supporting and confining parts of the exhaust chamber unit. The blocks of the wall 21 are slotted to form T-shaped slots 22 in their upper ends, and the sustaining frame parts of the exhaust chamber are provided with a plurality of T-shaped beams 24. The blocks, which form the upper part of the heat-treating chamber, are slidably located on the T-shaped beams 24, and the spaces, or cracks, between the blocks, may be sealed by a suitable material 25, which may be poured into the spaces between the blocks and allowed to harden, thus, providing a substantially sealed cover for the heating chamber. The furnace part having the exhaust unit rests upon the upper side and end wall portions of the heating chamber unit 10. Also, on one side, the upper edge of the wall of the heating chamber is spaced a short distance from the bottom wall thereof to form the space 27, through which articles may be inserted within the heating chamber. If desired, the bodies of the articles may rest upon the upper edge of the side wall of the heating chamber.

The exhaust chamber unit may be provided with frame parts 28, which are securely connected to the enclosing sheath and frame parts of the exhaust chamber unit. The parts 28 may be provided with suitable eyes 30, whereby a crane may be hooked to the frame parts 28 and the exhaust chamber unit lifted from the heating chamber unit to enable replacement of another exhaust chamber unit or repair and replacement of the heating chamber unit.

One end of the heating chamber is provided with a burner 31, having a length sufficient to extend across the said end of the heating chamber. The burner comprises a shell 32, having a curved, gas reflector part 34 located on one side and curved, relatively sloping surfaces 35 located on the other side, which terminate in a narrow opening 37. The opening 37 has a length which approximates the width of the interior of the heating chamber, and the major axes of the shell are located, substantially, horizontal and disposed near the bottom of the heating chamber and beneath the space 27, through which the articles may be inserted into the heating chamber.

Gas is introduced, under pressure, through pipes 38, into end walls 40 of the burner. The pipes 38 communicate with a pipe 41, which has a plurality of spaced openings 42, through which streams of gas are directed toward the curved reflector side 34 of the burner. The inner surfaces of the burner shell, and the outer surfaces of the pipe, are located in close proximity to form narrow openings 44 and 45 at the upper and lower sides of the pipe. The gas streams are deflected and divide, and move along the inner surface of the burner and through the openings 44 and 45, formed above and below the pipe 41, and are concentrated, by the sloping wall surfaces 35, until the mixture of the primary air and gas is projected through the opening 37, where it is ignited to form a flame, which extends, substantially, the length of the furnace and the articles disposed within the interior of the heating chamber thereof.

The burner is located near the terminus of a passageway 47, which extends downward through an end wall 48 of the heating chamber unit. The passageway 47 terminates in an outlet 50, which is located at right angles to the downwardly extending passageway 47, and the burner 31 is located in the outlet 50. The secondary air moves through the passageway 47 to the burner 31. The burner may be adjustably positioned, with reference to the moving secondary air in the outlet 50, to vary the air quantity that passes above and below, to cause the gas to, progressively, burn as it proceeds the length of the heating chamber, and, thus, the flame may be greatly extended into the heating chamber and toward or beneath the articles located therein. The burner shell 32 is slidably supported on ways 46 and is adjusted by means of a pair of racks 55, which mesh with a pair of gear wheels 57. The gear wheels are located on a shaft 58, which may be operated by a suitable hand wheel 60. The racks 55 are located on a baffle plate 52, slidably supported on and above the pipes 38. Consequently, when the hand wheel 60 is rotated, the baffle plate 52 is moved inward until its edge 54 engages with the shell 32 and moves the shell inwardly, with reference to the outlet 50. In order to regulate the amount of secondary air, which is directed below the burner, the wheel 60 may be rotated in the opposite direction to withdraw the baffle plate 52 from engagement with the burner 31 a distance sufficient to permit the desired quantity of air to pass behind and below the burner shell. Continued rotation of the hand wheel 60 in said opposite direction causes the outer edge of the baffle plate 52 to engage the bar 56, supported on the pipes 38, and, through the medium of said pipes 38, draw the burner shell 32 to a retracted position, relative to the outlet 50, and, particularly, with reference to the corner 49 formed at the juncture of the passageway 47 and the outlet 50. The burner is provided with a deflector plate 51, which projects upward, in the direction of the passageway 47, and, consequently, the air, which strikes the burner on one or the other side of the deflector plate 51, is deflected over the top of the burner or under the burner. The deflector plate, also, forms a division point for the air, and, consequently, as the burner is adjusted, a varying amount of the air will pass over or under the burner. The deflector is moved with the burner, as the burner is adjusted within the outlet 50 and the deflector plate 51 with reference to the corner 49. The baffle plate 52 operates to cause the air to move close about the burner 31, and to limit the movement of an excess amount of the air beneath the burner. Thus, according to the position of the burner, and, particularly, the relative positions of the deflector plate 51 and the baffle plate 52, with reference to the burner and the outlet 50, the air quantities, which move above and below the burner, may be altered, by adjustment of the burner in said outlet and the manipulation of said baffle plate, relative to the burner and deflector.

The passageway 47 communicates with the passageway 70 of the exhaust chamber unit 11. The exhaust chamber is provided with a pair of sheet-metal shells 61, each having, at one side, a curved, gas-reflecting side 62 and a V-shaped side 64, which has openings 65 disposed at the apex thereof. Within each of the shells is located a pipe 67 connected to a source of secondary air. The pipe 67 has a plurality of openings 68 for projecting the secondary air toward the curved, gas-reflecting side 62 of the shell, which operates to reflect the air along the surfaces of the sides of the shell and through the narrow passageways 63, formed between the pipe and the side walls of the shells, and toward the openings 65. The exhaust chamber is provided with a passageway 70, which communicates with the shells through the openings 65, and, also, with the passageway 47, through which the secondary air passes to the burner 31. The shells are welded to, or form a part of, a plate 71, which separates the exhaust gases of the burner from the secondary air that is conducted to the burner. Thus, the exhaust gases move from the heating chamber and toward the flue 72 along the surfaces of the shells, and the highly heated, secondary air passes through the passageway 70, to the passageway 47, and over or under, or both over and under, the burner, and aids in completing the combustion of the gas of the burner, and the heat, produced thereby, is conveyed through the walls of the shells to heat the secondary air, which is, thus directed to the burner.

In order to maintain the correct heat differential, to obtain the greatest recuperative value from the exhaust gases and to prevent the walls of the shell from becoming superheated by hotter exhaust gases, the shells are divided into zones or chambers 74, by suitable partitioning walls 73, and portions 75 of the pipe 67, in each of the chambers, are provided with the openings 68, so formed in area, or arranged in number, as to enable a progressive increase in the amount of air that is introduced into each of the chambers 74, more proximate the hotter zone of the exhaust chamber; that is, the point of entrance of the exhaust products into the exhaust chamber. Thus, the unheated secondary air from the source thereof may be directed to each chamber in such volume as to absorb, in the preheating of such volume of air, sufficient heat from the shell walls as would, otherwise, cause heat collapse and failure of the shell. Consequently, by the provision of said zones in the shell, it will be seen that the shell may be located in proximity to the heating chamber, whereby greater preheating efficiency of the secondary air is experienced and the heated secondary air need be conducted but short distances from the source of heat to the place of use in the heating chamber. Further, it will be appreciated that, by varying the volumes to respective chambers, the unheated secondary air may be introduced from either end of the shell, notwithstanding the relative position of first impingement of the shell by the hotter exhaust gases, thus, enabling convenient connection of the source of supply of secondary air with the shell and without regard to the point of connection of the source with the furnace.

If desired, the article-receiving space 27 may be cooled by a suitable water pipe 77, which may receive cooling water from a suitable source of supply.

I claim:

1. In a heat exchanger, the exchanger having a chamber; a source of heated gas; means for directing a stream of the heated gas through the chamber; the exchanger having a second chamber for conducting a gas from the exchanger; a metallic shell located in the first named chamber and in the path of the stream of heated gas, the shell having a curved reflector side and an opening in the side opposite the first named side communicating with the second named chamber; a source of supply of pressed air; and a pipe connected to the source of pressed air and extending through the shell and having openings for directing the pressed air into the shell and against the said curved side to deflect the air toward the opening.

2. In a heat exchanger, the exchanger having a chamber; a source of heated gas; means for directing a stream of the heated gas through the chamber; the exchanger having a second chamber for conducting a gas from the exchanger; a metallic shell located in the first named chamber and extending along the path of the stream of heated gas, the shell having a curved reflector side and an opening in the side opposite the first named side communicating with the second named chamber; a source of supply of pressed air; a pipe connected to the source of pressed air and extending through the shell and having openings for directing the pressed air into the shell and against the said curved side to return the air toward the opening, and the shell having sides inclined to each other and extending from the ends of the curved reflector side and located in proximity to the pipe, and terminating at edge parts of the opening.

3. In a heat exchanger, the exchanger having a chamber; a source of heated gas; means for directing a stream of the heated gas through the chamber; the exchanger having a second chamber for conducting a gas from the exchanger and a wall for separating the chambers; a metallic shell located in the first named chamber and extending along the path of the stream of heated gas, the interior of the shell having partitioning walls extending crosswise the direction of the stream to form a plurality of chamber parts within the shell; each chamber part of the shell having a curved reflector end and an opening communicating with the said second chamber and located in the chamber part at an end opposite the reflector end of the chamber part; a source of supply of pressed air; a pipe connected to the source of pressed air extending through the chamber parts of the shell and located intermediate the curved reflector ends and the openings and having openings for directing the pressed air into the chamber parts and against the said curved reflector ends of the chamber parts, each of the chamber parts having sides inclined to each other and extending from the ends of the curved reflector and located in proximity to the pipe, and terminating at opposite edge parts of the said openings communicating with the said second chamber; the area of the openings in the pipe, located in the consecutive chamber parts of the shell, varying and approximately decreasing as the temperature of the heated gases decrease.

FRANZ G. SCHWALBE.